United States Patent Office 3,065,158
Patented Nov. 20, 1962

3,065,158
METHOD OF VULCANIZING ORGANOSILOXANES
John F. Zack, Jr., Midland, Mich., assignor to Dow Corning Corporation, Midland, Mich., a corporation of Michigan
No Drawing. Filed Jan. 27, 1958, Ser. No. 711,184
4 Claims. (Cl. 204—154)

This application relates to radiation vulcanization of vinyl,hydrogensiloxanes.

It was known prior to this invention in U.S. Patent 2,763,609 that methyl- and phenylpolysiloxanes can be vulcanized by high energy electrons. It is also known from the copending application of Earl L. Warrick, Serial No. 640,308, filed February 15, 1957, now abandoned, that siloxanes can be vulcanized by electromagnetic radiation such as gamma-rays and X-rays.

Applicant has discovered that more efficient and more economically feasible cures can be obtained from both types of radiation when a siloxane or a mixture of siloxanes containing both silicon-bonded vinyl groups and silicon-bonded hydrogen atoms is employed.

It is the object of this invention to increase the economic feasibility of radiation cure of organo-siloxanes. Other objects and advantages will be apparent from the following description.

In accordance with this invention a polysiloxane containing as functional groups both vinyl groups and hydrogen atoms bonded to silicon, at least one molecular species in the siloxane being at least trifunctional, any remaining groups in said siloxane being essentially all selected from the group consisting of hydrocarbon and halogenated hydrocarbon radicals, is subjected to radiation of the group consisting of electromagnetic radiation of less than 5 angstrom units in wave length and particulated radiation having an energy of at least 100,000 electron volts until the desired cure is obtained.

In order to obtain the enhanced cure rate of this invention the siloxane must contain both silicon-bonded hydrogen and silicon-bonded vinyl groups. These two groups are known as "functional groups" in this specification. It is believed that the cure of the siloxane is brought about by reaction between the silicon-bonded hydrogen and the vinyl groups under influence of radiation to cause cross-linking of the siloxane molecules. It should be understood, of course, that this invention is not limited to any such mechanism.

For the purpose of this invention, the siloxane may contain the vinyl and SiH groups in the same molecule or the vinyl and the SiH may be in different molecules. For example, the siloxane can be a copolymer of a vinylsiloxane and an SiH-containing siloxane or the siloxane can be a mixture of a vinylsiloxane and an SiH-containing siloxane. Specifically, the siloxane can be, for example, a copolymer of vinylmethylsiloxane and methylhydrogensiloxane or the siloxane can be, for example, a mixture of a vinylmethylsiloxane and a methylhydrogensiloxane.

The relative amount of vinyl and SiH in the siloxane is not critical. Ideally, there should be about one vinyl group for every SiH. However, either component can be present in excess.

In order to obtain cross-linking at least one molecular species in the siloxane must be at least trifunctional. That is, there must be at least one molecular species which contains at least three vinyl groups per molecule or at least one molecular species which contains at least three SiH groups per molecule or at least one molecular species which contains at least a total of three functional groups (i.e. vinyl plus SiH) per molecule.

Any remaining groups attached to the silicon atoms of the siloxane in addition to the required vinyl and SiH can be any hydrocarbon group or any halogenated hydrocarbon group. The term "essentially all" with reference to these groups appearing in the specification and claims means that primarily the silicon atoms are substituted with such groups but that, in addition, there can be minor amounts of other groups normally found in siloxanes such as silicon-bonded hydroxyl, alkoxyl, or halogen.

The process of this invention is effective for the curing of both rubbery and resinous siloxanes. In other words, the process can be employed to cure siloxanes having an average of less than one organic group per silicon to greater than two organic groups per silicon.

For the purpose of this invention hydrocarbon groups which can be substituted on the silicon atoms include any alkyl group such as methyl, ethyl, octadecyl or myricyl; alkaryl hydrocarbon radicals such as benzyl or β-phenylethyl; aromatic hydrocarbon radicals such as phenyl, xenyl, tolyl, naphthyl, anthracyl and cycloaliphatic hydrocarbon radicals such as cyclohexyl, cyclopentyl and methylcyclohexyl. The groups attached to the silicon atom can also be any halogenated hydrocarbon radicals such as chloromethyl, bromopropyl, 3,3,3-trifluoropropyl, tetrafluoroethyl, chlorophenyl, chlorocyclohexyl, $\alpha,\alpha,\alpha$-trifluorotolyl, trifluoromonochlorocyclobutyl, iodophenyl, pentabromoxenyl, chloronaphthyl and brmoanthracyl.

Additional examples of hydrocarbon and halogenated hydrocarbon groups which can be attached to the silicon atoms are any polyvalent groups such as methylene, ethylene, phenylene, cyclohexylene, octadecylene, as well as such radicals which contain halogen atoms such as chlorine, bromine, fluorine or iodine.

The degree of polymerization of the siloxanes which can be cured by the process of this invention is not critical. Obviously, in the elastomer field, it is preferable to cure materials which have high molecular weight. However, if desired, fluid materials can also be cured. Thus, the siloxanes which are cured by the method of this invention can range in viscosity from thin fluids to non-flowing gums and resins.

In carrying out the process of this invention the temperature is not critical. Thus, the process of this invention can be carried out from temperatures ranging from say —80° C. to 250° C. or above. However, one of the advantages of the process of this invention is the fact that it can be carried out at room temperature or below.

The rate of cure obtained with the compositions of this invention will vary depending upon the substituent groups on the silicon, the intensity of the radiation, and the presence or absence of oxygen.

In general, faster cure is obtained with alkyl substituted siloxanes than with aryl substituted siloxanes. The higher the intensity of the radiation the faster the cure and generally curing takes place faster for the same radiation dosage in the absence of oxygen. However, samples can be satisfactorily cured in the presence of air.

One way of avoiding the oxygen inhibition is to cure the sample quite rapidly at high radiation dosage. Another way is to cure the material in an inert gas or in a vacuum.

Any high energy radiation can be employed in the process of this invention. High energy radiation in the terms of this invention includes both electromagnetic radiation having a wave length of less than 5 angstrom units such as X-rays or gamma-rays and high energy particulated radiation such as electrons, neutrons, protons and the like.

The radiation employed in this invention can be derived from any suitable source such as an X-ray machine, a radio-active isotope, an atomic pile or a particle accelerator such as a Van de Graaff machine.

The process of this invention is particularly useful for curing any type of coated, extruded or molded article. For example, it can be used to cure resinous and elastomeric organosilicon coatings on metal, wood, or ceramic surfaces; for the curing of extruded tubing or molded parts, and for the curing of electrical insulation on wires.

If desired, the siloxanes can contain additives such as fillers such as fume silicas, metal oxides, silica aerogels, crushed quartz, diatomaceous earth, precipitated silicas, carbon black, glass fibers, asbestos, clays and fluorocarbon resins; compression set additives such as mercuric oxide, barium zirconate and zinc oxide and pigments such as ferric oxide.

If desired, the silica fillers may have organosilyl groups attached to the surface thereof through SiOSi linkages. Examples of such groups are trimethylsilyl, phenyldimethylsilyl and trifluoropropyldimethylsilyl groups. Such treated silicas can be prepared by any of the methods shown in the art.

The following examples are illustrative only and should not be construed as limiting the invention which is properly delineated in the appended claims. All parts are parts by weight unless otherwise specified.

Example 1

100 parts of a copolymer gum composed of .14 mol percent methylvinylsiloxane and 99.86 mol percent dimethylsiloxane, 35 parts of a fume silica, 10 parts of a low molecular weight hydroxylated polysiloxane [1] and 10 parts by weight of methylhydrogenpolysiloxane fluid were milled to give a uniform mix. The stock was then cold pressed into a sheet. The sheet was then irradiated with the gamma radiation from cobalt 60. The physical properties obtained with varying dosages is shown in the table below.

| Dosage in mega-rads | Tensile in p.s.i. | Percent elongation at break | Percent tension set |
|---|---|---|---|
| 0.5 | 365 | 1,320 | 30 |
| 1.0 | 375 | 800 | 15 |
| 2 | 400 | 900 | 11 |
| 5 | 520 | 715 | 5 |

Example 2

This example shows the superior results obtained in the absence of air. The composition employed was identical with that of Example 1 except that 8.5 parts of the low molecular weight hydroxylated polysiloxane was employed and the samples were irradiated in a vacuum. The physical properties obtained with various radiation doses from the cobalt 60 is shown in the table below.

| Dosage in mega-rads | Tensile in p.s.i. | Percent elongation at break | Percent tension set |
|---|---|---|---|
| 0.3 | 625 | 975 | 6 |
| 0.5 | 950 | 500 | 3 |
| 1.0 | 1,000 | 575 | 0 |
| 2.0 | 850 | 475 | 0 |

Example 3

100 parts of a copolymer gum of 30 mol percent phenylmethylsiloxane, 0.14 mol percent vinylmethylsiloxane and 69.86 mol percent dimethylsiloxane, 35 parts of a fume silica, 10 parts of a low molecular weight hydroxylated dimethylsiloxane and 10 parts of a methylhydrogensiloxane fluid were milled until a uniform mix was obtained. The material was cold molded into a thin sheet and then irradiated with gamma radiation from cobalt 60 as shown below.

| Dosage in mega-rads | Tensile in p.s.i. | Percent elongation at break | Percent tension set |
|---|---|---|---|
| 10 | 555 | 920 | 12 |
| 20 | 530 | 583 | 0 |

Example 4

A mixture of 100 parts of the siloxane gum of Example 1, 45 parts of a silica aerogel, 11 parts of the hydroxylated siloxane of Example 1 and 10 parts of liquid methylhydrogenpolysiloxane were mixed on a mill and then pressed into a sheet ⅛ inch thick. The sample was then subjected to electron-irradiation having an energy of 2,000,000 electron volts until the total dosage was one mega-rad. The sample had the following properties: tensile strength 489 p.s.i., percent elongation at break 1604 and percent tension set 7.

Example 5

A mixture of 75% by weight of $(MeHSiO)_5$ and 25% by weight of a gum having the composition 8 mol percent vinylmethylsiloxane and 92 mol percent dimethylsiloxane was irradiated with gamma-rays from cobalt 60 to a total dosage of two mega-rads. The sample cured to a gel.

Example 6

Curing of the siloxane is obtained when the following siloxanes are subjected to X-radiation from an X-ray machine to a total dosage of two mega-rads:

(1) A copolymer gum composed of 5 mol percent methylvinylsiloxane, 5 mol percent methylhydrogensiloxane and 90 mol percent dimethylsiloxane
(2) A mixture of 100 parts of a copolymer of 25 mol percent monophenylsiloxane, 45 mol percent monomethylsiloxane, 10 mol percent phenylvinylsiloxane and 20 mol percent diphenylsiloxane and 20 parts of

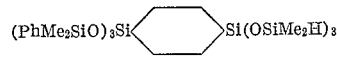

(3) A mixture of 100 parts of a methylvinylpolysiloxane gum and 25 parts of phenylhydrogenpolysiloxane
(4) A mixture of 100 parts of a copolymer of 50 mol percent dimethylsiloxane and 50 mol percent octadecylmethylsiloxane and 10 parts of a fluid copolymer of 1 mol percent trimethylsiloxane, 1 mol percent $HSiO_{3/2}$ and 98 mol percent dimethylsiloxane
(5) A mixture of 100 parts of a copolymer of 99 mol percent 3,3,3-trifluoropropylmethylsiloxane and 1 mol percent methylvinylsiloxane and 10 parts of a fluid methylhydrogenpolysiloxane
(6) A mixture of 100 parts of a copolymer of 5 mol percent methylvinylsiloxane and 95 mol percent dimethylsiloxane and 10 parts of a fluid 3,3,3-trifluoropropylhydrogenpolysiloxane
(7) A mixture of 100 parts of a copolymer of 25 mol percent methylvinylsiloxane and 75 mol percent dimethylsiloxane and 25 parts of tetraethyldisiloxane
(8) A mixture of 100 parts of a 100,000 cs. methylvinylpolysiloxane and 10 parts of $(H_2SiO)_4$
(9) A mixture of 100 parts of a copolymer of 90 mol percent dimethylpolysiloxane and 10 mol percent of a fluid methylhydrogenpolysiloxane and 10 parts of hexavinyldisiloxane That which is claimed is:

1. A method of curing siloxanes comprising subjecting a siloxane containing as functional groups both silicon-bonded vinyl groups and silicon-bonded hydrogen atoms, at least one molecular species in said siloxane being at least trifunctional, there being an average of at least 0.18 silicon-bonded hydrogen atoms per silicon-bonded vinyl

---

[1] The purpose of the low molecular weight hydroxylated polysiloxane is to prevent premature development of tensile and elongation due to the spontaneous interaction of the filler and gum.

group, any remaining groups attached to the silicon atoms in said siloxane being essentially all of the group consisting of hydrocarbon and halogenated hydrocarbon radicals, to ionizing radiation having an energy equivalent to at least 100,000 electron volts until the desired cure of the siloxane is obtained.

2. The method in accordance with claim 1 wherein the cure is carried out in the absence of oxygen.

3. A process in accordance with claim 1 wherein the siloxane is a mixture of a methylvinylsiloxane and a methylhydrogensiloxane.

4. A method of curing a siloxane which comprises subjecting a mixture of a methylvinylsiloxane and a methylhydrogensiloxane, in which at least one molecular species is at least trifunctional, there being an average of at least 0.18 silicon-bonded hydrogen atoms per silicon-bonded vinyl group, to ionizing radiation having an energy equivalent to at least 100,000 electron volts, in the absence of oxygen, until the desired cure of said siloxane is obtained.

References Cited in the file of this patent

UNITED STATES PATENTS

| | | |
|---|---|---|
| 2,763,609 | Lewis et al. | Sept. 18, 1956 |
| 2,766,220 | Kantor | Oct. 9, 1956 |

OTHER REFERENCES

Collinson et al.: "Chemical Reviews," vol. 56, No. 3, pp. 517–522, June 1956.

Harrington: "Plastics and Elastomers for Use in Radiation Fields," pp. 25–28, 36–39 and 41, November 30, 1956.

Bovey: "Effects of Ionizing Radiation on Natural and Synthetic High Polymers," pp. 178–186 (1958).